(12) United States Patent
Lacey et al.

(10) Patent No.: US 7,576,330 B1
(45) Date of Patent: Aug. 18, 2009

(54) COMPUTED TOMOGRAPHY DETECTOR APPARATUS

(75) Inventors: Joseph James Lacey, Cambridge, WI (US); Ashutosh Joshi, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/112,129

(22) Filed: Apr. 30, 2008

(51) Int. Cl.
*G01T 1/24* (2006.01)

(52) U.S. Cl. .................................. 250/370.15

(58) Field of Classification Search ............ 250/370.01–370.15; 378/98.8, 141–142, 19, 378/189–190, 193, 196–200
See application file for complete search history.

(56) References Cited

U.S. PATENT DOCUMENTS

| | | | |
|---|---|---|---|
| 6,713,769 B2 * | 3/2004 | Vafi et al. ............. | 250/370.15 |
| 7,065,173 B2 | 6/2006 | Lacey et al. | |
| 7,104,687 B2 * | 9/2006 | Okamura et al. ............ | 378/200 |
| 7,439,516 B2 * | 10/2008 | Zeman et al. ............ | 250/370.11 |
| 2005/0067579 A1 * | 3/2005 | Tsuchiya et al. ......... | 250/370.15 |
| 2005/0287008 A1 * | 12/2005 | Lacey et al. .................... | 417/32 |

OTHER PUBLICATIONS

Pokric et al., "Development of large area CCD-based X-ray detector for macromolecular crystallography," 1999, Proceedings of SPIE, vol. 3774. pp. 46-57.*

* cited by examiner

*Primary Examiner*—David P Porta
*Assistant Examiner*—Kiho Kim

(57) ABSTRACT

A computed tomography detector apparatus includes a substrate defining a recessed area. The computed tomography detector apparatus includes a heat pipe at least partially disposed within the recessed area. The computed tomography detector apparatus also includes an electronic component attached to the substrate.

20 Claims, 2 Drawing Sheets

COMPUTED TOMOGRAPHY DETECTOR APPARATUS

BACKGROUND OF THE INVENTION

The subject matter disclosed herein relates to a computed tomography (CT) detector apparatus including a heat pipe.

Typically, in CT systems, an x-ray source emits an x-ray beam toward a subject or object, such as a patient or a piece of luggage, positioned on a support. The x-ray beam, after being attenuated by the object, impinges upon a detector assembly. The intensity of the attenuated x-ray beam received at the detector assembly is typically dependent upon the attenuation of the x-ray beam by the object.

In known third generation CT systems, the x-ray source and the detector assembly are rotated on a rotatable gantry portion around the object to be imaged so that a gantry angle at which the x-ray beam intersects the object constantly changes. The detector assembly typically includes a plurality of detector modules. Each detector module is typically divided into a plurality of detector elements. Data representing the intensity of the received x-ray beam at each of the detector elements are collected across a range of gantry angles. The data are ultimately processed to form an image.

The electronic components produce heat that may cause a degradation in image quality through multiple mechanisms. For example, the gain of a photodiode layer within the detector module is highly temperature dependent and operating the photodiode layer at too high of a temperature may lead to image artifacts such as spots or rings. Also, the amount of pixel-to-pixel leakage between photodiodes increases with temperature. A high level of pixel-to-pixel leakage negatively impacts the signal to noise ratio and may result in reduced image quality. Also, an increase in the temperature of the detector module may result in problems with the mechanical alignment of the detector assembly and a collimator. Third generation CT imaging systems rely on an accurately aligned collimator to effectively block scattered x-ray. However, the mechanical alignment of the detector assembly and the collimator may change as the temperature increases outside of an optimal operating range. If the collimator is not properly aligned with the detector assembly, the result may be additional image artifacts.

The problem is that excessive heat within the detector assembly may lead to image artifacts from multiple sources, resulting in images of diminished quality.

BRIEF DESCRIPTION OF THE INVENTION

The above-mentioned shortcomings, disadvantages and problems are addressed herein which will be understood by reading and understanding the following specification.

In an embodiment, a computed tomography detector apparatus includes a substrate defining a recessed area. The apparatus includes a heat pipe at least partially disposed within the recessed area and the apparatus also includes an electronic component attached to the substrate.

In another embodiment, a computed tomography detector apparatus includes a rail and a substrate defining a recessed area attached to the rail. The apparatus includes an electronic component attached to the substrate. The apparatus also includes a heat pipe secured to the substrate via a thermal interface material and at least partially disposed within the recessed area.

In another embodiment, an apparatus for regulating the temperature of a computed tomography detector includes a heat pipe and a substrate in thermal communication with the heat pipe. The substrate is adapted to support an electronic component. The apparatus also includes a rail attached to the substrate and a liquid coolant in thermal communication with the rail.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Figure 1:
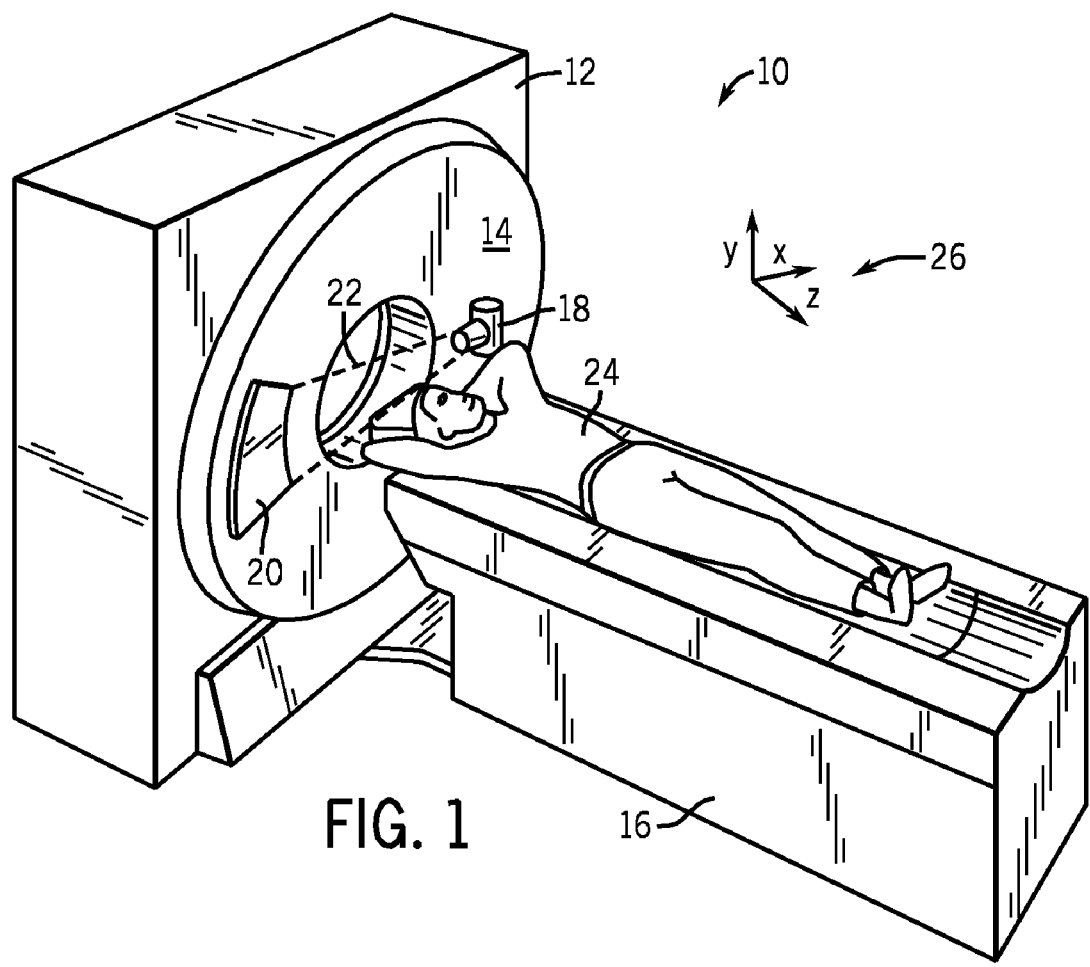
FIG. 1 is a schematic diagram illustrating a computed tomography system in accordance with an embodiment.

Referring to FIG. 1, a schematic representation of a computed tomography (CT) system 10 according to an embodiment is shown. The CT system 10 includes a gantry 12, a rotatable gantry portion 14, and a support 16. The rotatable gantry portion 14 is adapted to retain an x-ray source 18 and a detector assembly 20. The x-ray source 18 is configured to emit an x-ray beam 22 towards the detector assembly 20. The detector assembly 20 is comprised of a plurality of detector modules (not shown). The support 16 is configured to support a subject 24 being scanned. Hereinafter, the terms "subject" and "object" shall include anything capable of being imaged. The support 16 is capable of translating the subject 24 along a z-direction with respect to the gantry 12 as indicated by a coordinate axis 26.

Figure 2:
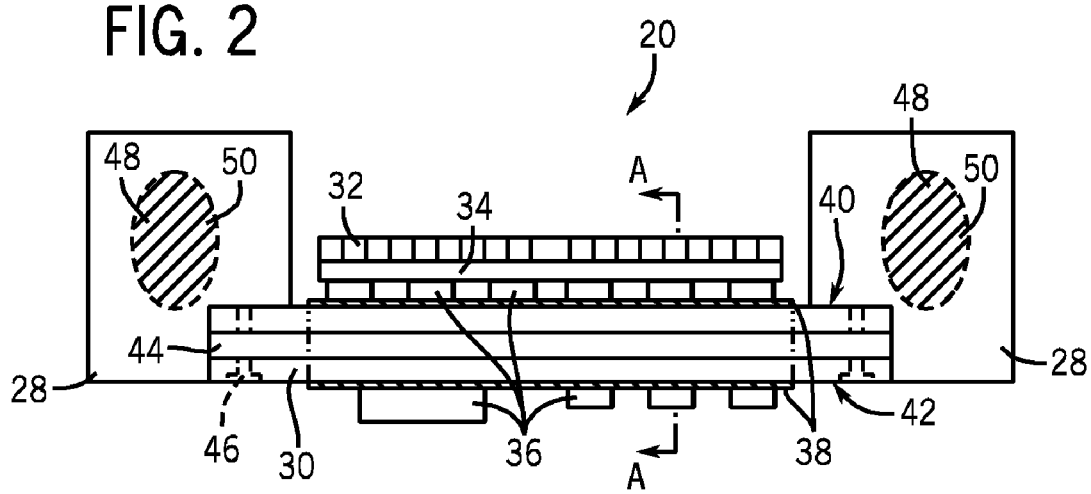
FIG. 2 is a schematic diagram illustrating a cross-section of a detector assembly attached to a pair of rails in accordance with an embodiment.

Referring to FIG. 2, a schematic representation of a cross section of the detector assembly 20 attached to a pair of rails 28 is shown in accordance with an embodiment. For purposes of this disclosure, the radially inward direction of the detector assembly 20 is towards the top of FIG. 2. The detector assembly 20 comprises a substrate 30, a scintillator 32, a photodiode layer 34, a plurality of electronic components 36, and a flexible circuit (flex circuit) 38. The substrate 30 may comprise a ceramic, such as alumina, or another suitably rigid material. The scintillator 32, the photodiode layer 34, the plurality of electronic components 36, and the flexible circuit 38 are mounted to the substrate 30. The scintillator 32 converts received x-rays into visible light. The photodiode layer 34 is mounted radially outward from the scintillator 32 and converts the visible light from the scintillator 32 into an electric signal. The plurality of electronic components 36 may comprise one or more components from the following nonlimiting list: an analog-to-digital converter (not shown) for converting the analog electrical signals from the photodiode into digital signals, a field-programmable gate array (not shown), and a power regulator (not shown). The analog-to-digital converter, the field-programmable gate array, and the power regulator are all well-known by those skilled in the art. As shown in FIG. 2, the plurality of electronic components 36 may be mounted on both a radially inner side 40 and a radially outer side 42 of the substrate 30. The flexible circuit 38 connects the electronic components 36 such as the analog to digital converter, the power regulator, and the field-programmable gate array.

A heat pipe 44 is shown within the substrate of the cross-section of FIG. 2. According to one embodiment, the heat pipe 44 includes a sealed hollow tube adapted to retain a working fluid and a wick. The working fluid generally comprises a liquid phase component and a gaseous phase component. The heat pipe 44 transfers heat from a high temperature portion of the heat pipe 44 to a low temperature portion of the heat pipe 44. The working fluid in the liquid phase component absorbs heat from the high temperature portion of the heat pipe 44 and undergoes a phase change to the gaseous phase component of the working fluid. The gaseous phase component of the working fluid migrates to the low temperature portion of the heat pipe 44 where it condenses back into the liquid phase component, thus giving off heat. The liquid phase component of the working fluid returns back to the high temperature portion of the heat pipe 44 by moving up the wick via capillary action. Heat pipes are well-known by those skilled in the art and may comprise shapes other than those depicted in FIG. 2 and FIG. 3.

According to the embodiment depicted in FIG. 2, the heat pipe 44 spans between both of the rails 28. The heat pipe 44 transports heat generated from the electronic components 36 to both of the rails 28. It should be appreciated that alternate embodiments could use multiple heat pipes 44, with each heat pipe 44 only transferring heat in a single direction.

Since FIG. 2 is a cross-section, only one heat pipe 44 is visible. However, embodiments may include two or more heat pipes 44 to aid in the cooling of the detector assembly 20. Since the detector assembly 20 is mounted on the rotatable gantry portion 14 (shown in FIG. 1) and subject to a centrifugal loading when the CT system 10 (shown in FIG. 1) is scanning, it may be advantageous to position the heat pipe 44 so that both the high temperature portion of the heat pipe 44 and the low temperature portion of the heat pipe 44 are generally the same radial distance from the axis of rotation of the rotatable gantry portion 14.

According to an embodiment, the heat pipe 44 may optionally be electrically connected to the rail 28 by a bushing 46 or another form of an electrical conductor. The bushing 46 serves to electrically ground the heat pipe 44. If an embodiment does not include the bushing 46, it may still be important to electrically ground the heat pipe 44 in another manner so that the heat pipe 44 does not act as an antenna.

According to an embodiment, the CT system 10 (shown in FIG. 1) may use a liquid coolant 48 to remove heat from the rails 28. For example, each rail 28 may optionally define a passageway 50 for retaining the liquid coolant 48. The liquid coolant 48 would pass through the passageway 50 absorbing heat from the rail 28. While not shown in FIG. 2, the passageway 50 forms part of a liquid cooling circuit. After absorbing heat from the rail 28, the liquid coolant 48 travels to a heat exchanger (not shown). The liquid coolant 48 gives off heat to the heat exchanger before cycling back through the passageway 50 defined by the rail. It should be understood that the cooling circuit may be configured differently according to additional embodiments. Additionally, other embodiments may not use the liquid cooling circuit. Instead, they may remove the heat from each rail 28 by another mechanism, such as forced air cooling as is well-known by those skilled in the art.

Figure 3:
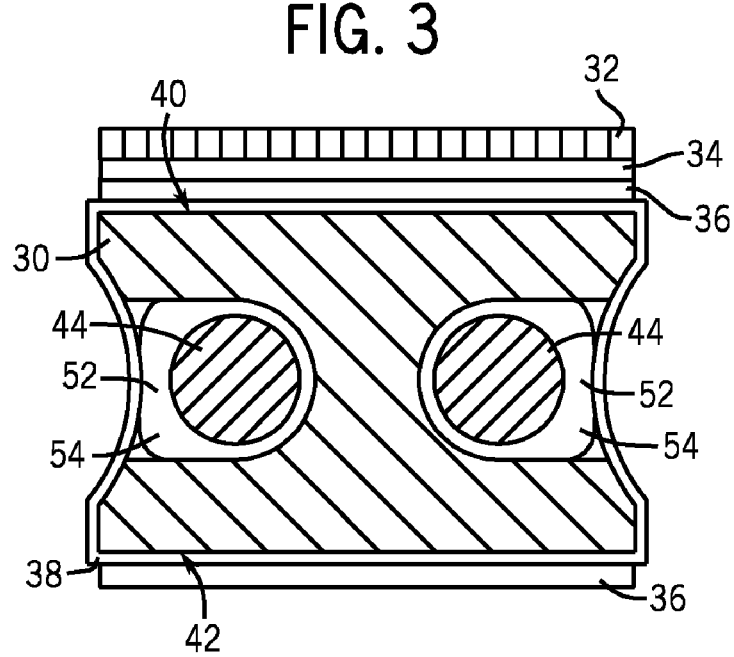
FIG. 3 is a schematic diagram illustrating a cross section of a detector assembly in accordance with an embodiment.

Referring to FIG. 3, a schematic cross-sectional view taken along section A-A of FIG. 2 is shown in accordance with an embodiment. Common components between FIG. 2 and FIG. 3 share common reference numbers.

The scintillator 32 and the photodiode layer 34 are mounted to the flex circuit 38 on the radially inner side 40 of the substrate 30. According to an embodiment, the substrate 30 is generally I-shaped in cross section, as shown in FIG. 3. The substrate 30 should be stiff in order to minimize motion of the scintillator 32 and the photodiode layer 34 while scanning. Additionally, the substrate 30 should be light due to the high g-loading caused by the rotation of the rotatable gantry portion 14 (shown in FIG. 1). Designing a substrate 30 with a generally I-shaped cross section helps accomplish both of these goals. However, it should be understood that it would be possible to design a substrate 30 meeting the stiffness and weight criteria with either a generally I-shaped cross section that is different from the one shown in FIG. 3 or with a cross-section of a completely different shape.

In the embodiment shown in FIG. 3, the substrate defines a recessed area 52 for securing each of the heat pipes 44. The heat pipes 44 fit completely within the recessed areas 52 defined by the substrate 30 and are held in place with a thermal interface material 54. The thermal interface material 54 secures the heat pipes 44 to the substrate 30 and conducts heat from the substrate 30 to the heat pipe 44. According to an embodiment, the thermal interface material 54 may be an epoxy or a solder. It is important to understand that not all embodiments of the invention need to have a thermal interface material 54. For example, the recessed area 46 may be shaped to retain the heat pipe 44 without the need for a thermal interface material 54 with adhesive qualities. One example of this includes a substrate with a cylindrical recessed area adapted to retain the heat pipe 44 via a press fit. Additional embodiments may include welding or brazing the heat pipe 44 to the substrate 30. For the purposes of this disclosure, the term recessed area also includes hollow areas of the substrate 30 that would be capable of surrounding the whole circumference of the heat pipe 44.

FIG. 3 schematically illustrates how the flex circuit 38 wraps generally around the perimeter of the substrate 30 according to an embodiment. The flex circuit 38 connects the electronic components 36 on the radially inner side 40 of the substrate 30 to the electronic components 36 on the radially outer side 42 of the substrate 30. According to an embodiment, the flex circuit 38 fits partially within the recessed area 52 defined by the substrate 30. According to the embodiment shown in FIG. 3, the flex circuit 38 is attached to the thermal interface material 54. According to other embodiments, the flex circuit 38 may be directly attached to the heat pipe 44. The recessed area 52 defined by the substrate 30 may provide advantages during the manufacturing of the detector modules. For example, if the flex circuit 38 is attached first to both the radially inner side 40 of the substrate 30 and to the radially outer side 42 of the substrate 30, the recessed area 52 will accommodate any slack left in the flex circuit 38. By taking up the slack in the flex circuit 38, the recessed area 52 relaxes the tolerances needed for both the substrate 30 and the flex circuit 38. According to other embodiments, the flex circuit 38, may be electrically connected to the heat pipe 44, or the flex circuit 38 may be electrically connected to the thermal interface material 54 in order to electrically ground the heat pipe 44.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computed tomography detector apparatus comprising:
   a substrate defining a recessed area;
   a heat pipe at least partially disposed within the recessed area, said heat pipe comprising a wick; and
   an electronic component attached to the substrate.

2. The apparatus of claim 1, wherein the substrate defines a generally cylindrical recessed area adapted to retain the heat pipe.

3. The apparatus of claim 1, wherein the substrate comprises a ceramic.

4. The apparatus of claim 1, wherein the electronic component is selected from the group consisting of an analog-to-digital converter, a field-programmable gate array, and a power regulator.

5. The apparatus of claim 1, wherein the heat pipe further comprises a high temperature portion and a low temperature portion.

6. The apparatus of claim 5, wherein the wick is configured to move a working fluid from the low temperature portion to the high temperature portion via capillary action.

7. A computed tomography detector apparatus comprising:
   a rail;
   a substrate attached to the rail, the substrate defining a recessed area;
   an electronic component attached to the substrate; and
   a heat pipe secured to the substrate via a thermal interface material, said heat pipe at least partially disposed within the recessed area, said heat pipe comprising a wick.

8. The apparatus of claim 7, wherein the heat pipe and the rail are connected by an electrical conductor.

9. The apparatus of claim 8, wherein the electrical conductor comprises a bushing.

10. The apparatus of claim 7, wherein the thermal interface material comprises an epoxy or a solder.

11. The apparatus of claim 7, further comprising a flexible circuit attached to the electronic component.

12. The apparatus of claim 11, wherein the flexible circuit wraps from a first side of the substrate to a second side of the substrate.

13. The apparatus of claim 11, wherein the flexible circuit and the heat pipe are electrically connected.

14. The apparatus of claim 11, wherein the flexible circuit is electrically connected to the heat pipe.

15. The apparatus of claim 7, further comprising a working fluid retained within the heat pipe.

16. The apparatus of claim 15, wherein the wick is adapted to move the working fluid within the heat pipe via capillary action.

17. The apparatus of claim 15, wherein the working fluid comprises a liquid phase component and a gaseous phase component.

18. An apparatus for regulating the temperature of a computed tomography detector comprising:
   a heat pipe comprising a wick;
   a substrate in thermal communication with the heat pipe, the substrate adapted to support an electronic component;
   a rail attached to the substrate; and
   a liquid coolant in thermal communication with the rail.

19. The apparatus of claim 18, wherein the rail defines a passageway adapted to transfer the liquid coolant.

20. The apparatus of claim 18, wherein the liquid coolant comprises a dielectric oil or a perfluorocarbon fluid.

* * * * *